Nov. 29, 1927.  
H. P. JENSEN  
VEHICLE COUPLING  
Filed May 2, 1927
1,650,838
2 Sheets-Sheet 1
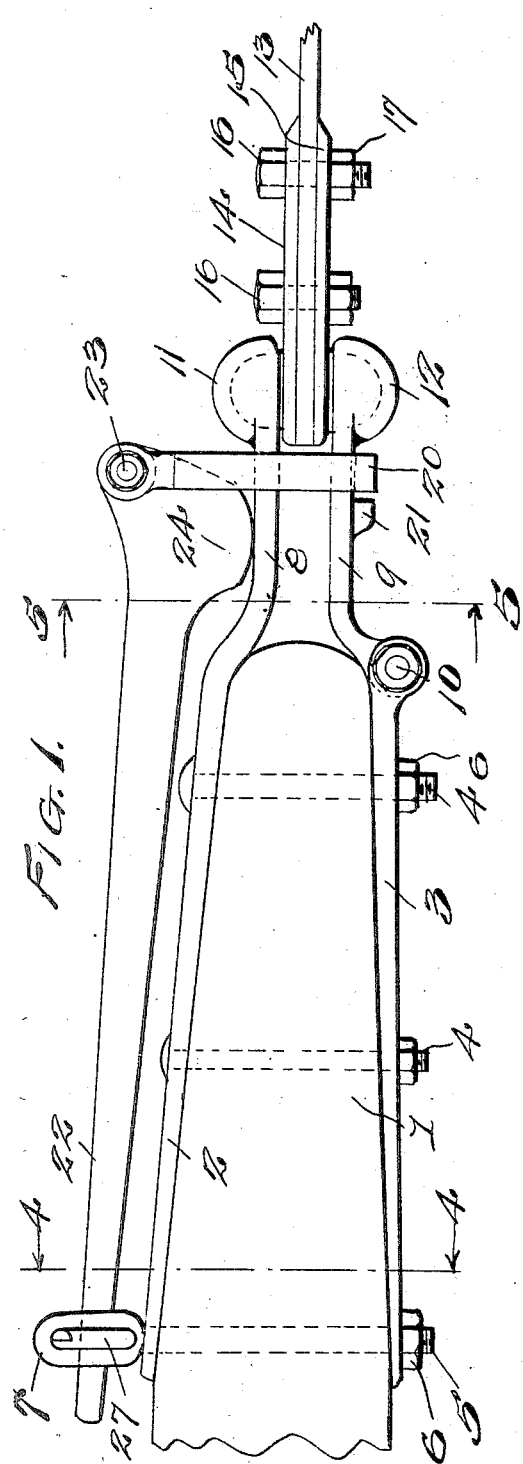
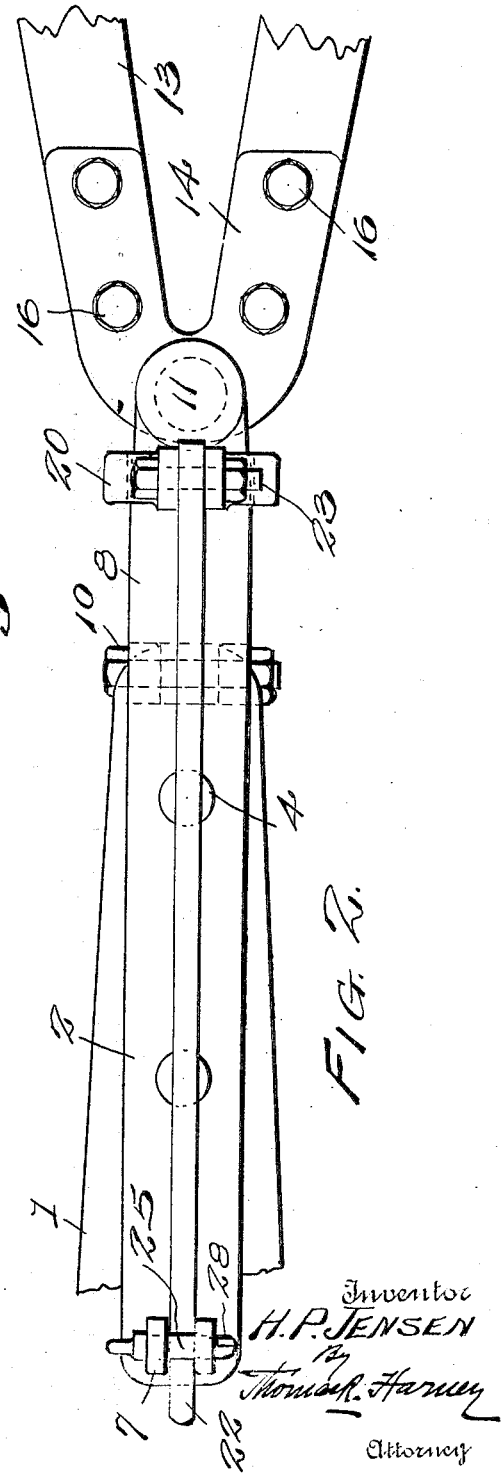
Inventor  
H. P. JENSEN  
By Thomas R. Harvey  
Attorney

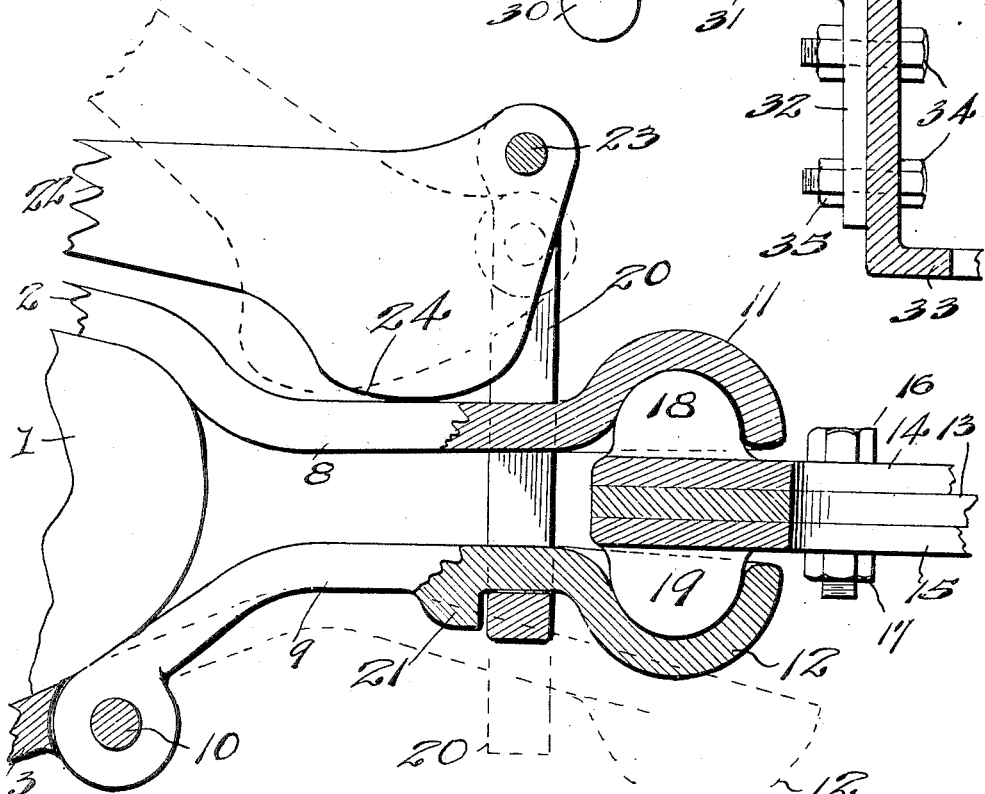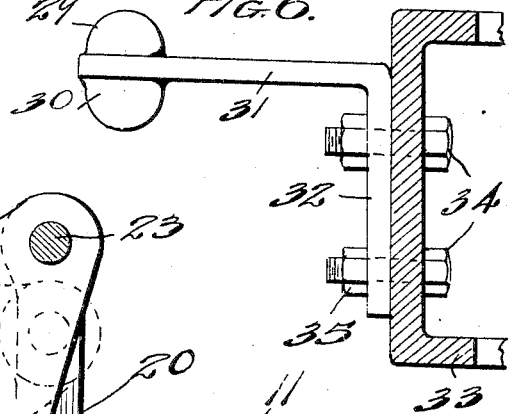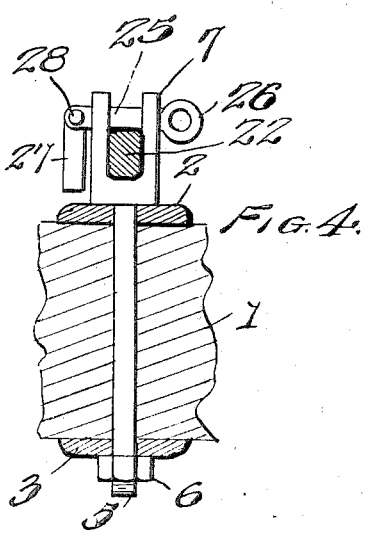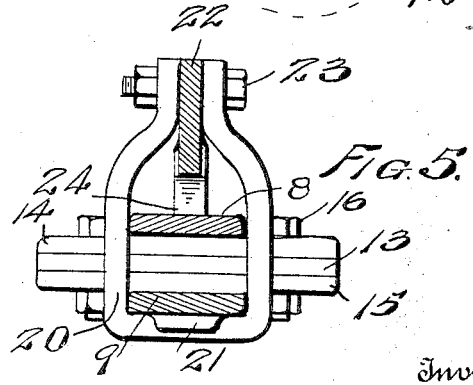

Patented Nov. 29, 1927.

1,650,838

UNITED STATES PATENT OFFICE.

HANS P. JENSEN, OF AUMSVILLE, OREGON.

VEHICLE COUPLING.

Application filed May 2, 1927. Serial No. 188,208.

My present invention relates to improvements in vehicle couplings which, while adapted for use with various types of vehicles, is especially designed and adapted for use with automotive vehicles such as trailers for automobiles, tractors, trucks and similar vehicles. The primary object of my invention is the provision of a quick detachable coupling for the vehicles which is simple in construction and operation, which may be locked and released with facility, and which is inexpensive in cost of manufacture, and in maintenance and repair.

The invention consists in certain novel combinations and arrangements of parts whereby a flexibility is secured in the coupling that permits adjustments in both vertical and lateral planes to compensate for differences in position of the tractor or pulling vehicle and the trailer or towed vehicle, all as will hereinafter be more fully pointed out and claimed.

In the accompanying drawings I have illustrated one complete example of the physical embodiment of my invention wherein the parts are combined and arranged in accord with the best mode I have thus far devised for the practical application of the principles of my invention, and a modified form of one of the parts is also shown in the drawings.

Figure 1 is a view in side elevation showing the coupling in operative position, as between a towing vehicle and a towed vehicle of any suitable type.

Figure 2 is a top plan view of the coupling of Figure 1.

Figure 3 is an enlarged, detail, sectional view of the coupling head, showing by dotted lines the release position.

Figure 4 is a detail sectional view at line 4—4 of Figure 1.

Figure 5 is a detail sectional view at line 5—5 of Figure 1.

Figure 6 is a view showing a modified form of draw-plate.

In carrying out my invention I utilize the draft tongue 1 generally pivoted to the trailer or vehicle to be towed and fashioned of wood as usual. The tongue is provided with top and bottom irons or iron plates 2 and 3 respectively and they are secured to the tongue by means of bolts as 4 and 5 passing vertically through the tongue and irons and secured by nuts as 6. The rear bolt 5 is provided with a specially formed head 7 of U-shape, which is designed for use with the coupling lever 22 as will be described hereinafter.

To provide the coupling device I utilize forward extensions 8 and 9 on the upper and lower irons 1 and 3, and the extension 9 is hinged at 10 to the lower iron 3, while the extension 8 forms an integral part of the iron or plate 2 on the top of the tongue. Each of these extensions is fashioned with a hemispherical or hollow socket-head as 11 and 12 arranged with their openings adjoining, but spaced apart as best seen in Figure 3. The pulling or towing member is here shown as an angular draw plate 13 which, in the case of a Ford automobile is connected to the spring clips of such a vehicle in manner to properly pull the trailer. Upper and lower head plates 14 and 15 also of angular shape are bolted rigidly to this draw plate by bolts 16 and nuts 17, and each of these head plates is fashioned with a hemispherical head as 18 and 19 complementary to the sockets 11 and 12.

The heads 18 and 19 project in opposite directions in a vertical plane and they may be fashioned integrally with the head plates, or the heads may be made separately and attached to the plates in suitable manner as desired. The socket-heads as shown in Figure 3 fit around the heads 18 and 19 to permit a swivel action between the draw plate and the draft tongue, in both a vertical and in a lateral direction, thus permitting the pulling vehicle to make a turn with facility, and also permitting relative movement of the parts of the coupling to compensate for irregularities in the ground over which the vehicles are passing.

The lower, hinged extension 9 and its socket-head 12 are held in operative position by means of a clevis 20 that encircles the extensions and holds the socket head 12 on head 19 and at the same time assists in holding the socket head 11 down on the head 18 as seen in Figure 3. The clevis is located between the coupling heads and a lug 21 on the underface of the bottom extension 9 and is retained at this position for the purpose of securing a maximum leverage for holding the extensions and socket-heads in locked position.

A lever 22 is pivoted at 23 in the clevis and it extends to the rear, parallel with and above the top iron or iron plate 2, and this lever is fashioned with a cam portion 24 that frictionally engages the upper face of the upper extension 8 as shown in Figure 3. Thus as the lever is turned on its pivot 23 to full position in Figure 3, the clevis pulls up on the extension 9 and the cam bears down on the extension 8 to engage the two socket-heads on their heads 18 and 19. The frictional engagement is such as to hold the parts in stable relation, but to permit necessary movement of a swivel joint between the socket heads and the ball heads.

The free end of the lever is fastened to the draft tongue by means of the U-head 7 of the bolt 5 in which the lever fits, and a cotter pin 25 passes through the perforated ears of the U-head and over the lever to retain the latter. The cotter pin is provided with a retaining head at one end as 26 and at its other end a bendable or foldable arm 27 is pivoted at 28, thus permitting ready insertion and release of the cotter pin and insuring against displacement or loss of the pin. When the lever is to be manipulated, of course the pin is removed and the lever thus freed for its action as indicated by dotted and full lines in Figure 3.

In Figure 6 I illustrate the two heads 29 and 30 as forming part of an angular draw plate 31 as a modified type of draw plate. In this instance the plate is provided with a flange 32 to be attached to a cross bar as 33 of an automotive truck chassis, by attaching bolts 34 and nuts 35

Other changes or modifications and alterations may be made when desirable or required, differing from the exemplification shown in my drawings, without departing from the spirit of my invention and included within the scope of my appended claim.

Having thus fully described my invention, what I claim as new and desire to secure by Letters Patent is:

The combination with a draw plate having a pair of oppositely projecting hemispherical heads, of a pair of draft irons having a pair of extensions one of which is hinged, socket-heads on the extensions for engagement with said hemispherical heads, a clevis encircling said extensions, a guide lug on the underside of the hinged extension forming an abutment for the clevis, a lever pivoted in the clevis and a cam on the lever for engagement with one of the extensions, and means for retaining the free end of the lever in locked position.

In testimony whereof I have affixed my signature.

HANS P. JENSEN.